(12) United States Patent
Bollen et al.

(10) Patent No.: US 8,380,607 B2
(45) Date of Patent: Feb. 19, 2013

(54) PREDICTING ECONOMIC TRENDS VIA NETWORK COMMUNICATION MOOD TRACKING

(75) Inventors: Johan L T M Bollen, Bloomington, IN (US); Hulna Mao, Bloomington, IN (US)

(73) Assignee: Indiana University Research and Technology Corporation, Indianapolis, IN (US)

( * ) Notice: Subject to any disclaimer, the term of this patent is extended or adjusted under 35 U.S.C. 154(b) by 0 days.

(21) Appl. No.: 12/972,401

(22) Filed: Dec. 17, 2010

(65) Prior Publication Data

US 2012/0158613 A1    Jun. 21, 2012

(51) Int. Cl.
*G06Q 40/00* (2012.01)
(52) U.S. Cl. ......... 705/36 R; 705/35; 705/7.31; 705/319
(58) Field of Classification Search ............... 705/35, 705/36 R, 26.1, 7.31, 319, FOR. 113; 600/301; 706/13, 45–48, 50
See application file for complete search history.

(56) References Cited

U.S. PATENT DOCUMENTS

| | | | |
|---|---|---|---|
| 7,043,462 B2 * | 5/2006 | Jin et al. ............................ | 706/13 |
| 7,185,065 B1 * | 2/2007 | Holtzman et al. ............ | 709/217 |
| 7,243,056 B2 * | 7/2007 | Olhofer et al. ..................... | 703/7 |
| 7,363,280 B2 * | 4/2008 | Jin et al. ............................ | 706/13 |
| 7,363,281 B2 * | 4/2008 | Jin et al. ............................ | 706/13 |
| 7,428,514 B2 * | 9/2008 | Jin et al. ............................ | 706/13 |
| 7,509,274 B2 * | 3/2009 | Kam et al. ....................... | 705/35 |
| 7,783,583 B2 * | 8/2010 | Sendhoff et al. ................ | 706/13 |
| 2001/0042037 A1 * | 11/2001 | Kam et al. ....................... | 705/36 |
| 2009/0030303 A1 * | 1/2009 | Pradeep et al. ................ | 600/411 |
| 2009/0030717 A1 * | 1/2009 | Pradeep et al. ................... | 705/1 |
| 2009/0082643 A1 * | 3/2009 | Pradeep et al. ................ | 600/301 |
| 2009/0099948 A1 * | 4/2009 | Geltner et al. .................. | 705/35 |
| 2010/0280973 A1 * | 11/2010 | Banker ......................... | 705/400 |
| 2010/0281399 A1 * | 11/2010 | Banker ......................... | 715/758 |
| 2012/0083705 A1 * | 4/2012 | Yuen et al. ..................... | 600/508 |
| 2012/0083714 A1 * | 4/2012 | Yuen et al. ..................... | 600/587 |
| 2012/0083715 A1 * | 4/2012 | Yuen et al. ..................... | 600/595 |
| 2012/0083716 A1 * | 4/2012 | Yuen et al. ..................... | 600/595 |

OTHER PUBLICATIONS

Kane et al "Financial Forecasting and Fules Extraction From Trained Networks" Jun. 27-Jul. 2, 1994 IEEE International World Congress on Computational Intelligencepp 3190-3194, vol. 5.*
Birinyi, Laslo "Fundamentally Flawed" Dec. 11, 2000 Forbes pp. 360.*
Baker et al. "Psychological Biases of Investors" Summer 2002, Financial Services Review V11N2 pp. 37-116.*
Sen, Basudeb "Organisational Mind: Response to a Paradigm Shift in the Indian Business Environment" 2003 International Journal of Human Resources Development and Management V3N1 pp. 49-60.*

(Continued)

*Primary Examiner* — Kelly Campen
(74) *Attorney, Agent, or Firm* — Faegre Baker Daniels LLP

(57) ABSTRACT

A method of investigating public mood from a multi-dimensional model approach and a method to predict economic market trends above chance level based on the multi-dimensional model approach are provided. The text-content of several large-scale collections of daily network communications are analyzed via mood assessment tools, measuring various mood dimensions. A Granger Causality analysis investigated the correlation between daily changes in public mood states via results of the daily mood time series of the mood assessment tools with changes in value of the Dow Jones Industrial Average ("DJIA") over time. Based on the above investigation, a Self-Organizing Fuzzy Neural Network model was trained to predict next-day DJIA value based on a combination of past DJIA values and public mood state measurements across several specified mood dimensions, such as calm and a combination of calm and happy.

19 Claims, 10 Drawing Sheets

OTHER PUBLICATIONS

Halpern, Alex "A New Climate for Investors" Jan. 29, 2007 Business Week on Line.*
Bollen et al. "Twitter Mood as a Stock Market Predictor" Oct. 2011 Computer vol. 33 No. 10 pp. 91-94.*
Fama, Eugene F, e. A. "The Adjustment of Stock Prices to New Information", International Economic Review, 10vol. 10, No. 1, Feb. 1969, pp. 1-21.
Fama, E. F. "American Finance Association", The Journal of Finance, vol. 46, No. 5, Dec. 1991, pp. 1575-1617.
H.Cootner, P. (1964) The random character of stock market prices. (MIT).
Fama, E. F., The Behavior of Stock-Market Prices, THe Journal of of Business, vol. 38, No. 1, Jan. 1965, pp. 34-105.
Qian, Bo, Rasheed, & Khaled. "Stock Market Prediction With Multiple Classifiers", Appt. Intell, (2007), pp. 25-33.
Gallagher, L. A & Taylor, M. P. "Permanent and Temporary Components of Stock Prices: Evidence from Assessing Macroeconmic Shocks", Southern Economic Journal, vol. 63, No. 2, Oct. 2002, pp. 345-362.
Kavussanos, M & Dockery, E. "A Multivariate Test for Stock Market Efficiency: the case of ASE", Applied Financial Economics, Oct. 7, 2010, pp. 573-579.
Butler, K. C & Malaikah, S. J. "Efficiency and Inefficiency in Thinly Traded Stock Markets: Kuwait and Saudi Arabia", Journal of Banking and Finance, (1992), pp. 197-210.
Schumaker, R. P & Chen, H. "Textual Analysis of Stock Market Prediction Using Breaking Financial News: The AZFin Text System", (2009) ACM Trans. Information Systems, vol. 27, No. 2: pp. 12:1-12:19.
Gilbert, E & Karahalios, K. "Widespread Worry and the Stock Market", Proceeding of the Fourth International AAAI Conference on Weblogs and Social Media, (2010), pp. 58.
Gruhl, D, Guha, R, Kumar, R, Novak, J, & Tomkins, A. "The Predictive Power of Online Chatter", (ACM, New York, NY, USA), Aug. 21-24, 2005, pp. 78-87.
Mishne, G & Glance, N. (2006) "Predicting Movie Sales from Blogger Sentiment", American Association for Artifcual Intelligence, 2005.
S. Asur and B. A. Huberman, "Predicting the Future With Social Media", 2010 Predicting the Future with Social Media arXiv:1003.5699v1. Mar. 2010.
Choi, H & Varian, H. "Predicting the Present with Google Trends", Google, Inc. Apr. 10, 2009, pp. 1-23.
Liu, Y, Huang, X, An, A, & Yu, X. "ARSA: A Sentiment-Aware Model for Predicting Sales Performance Using Blogs", SIGIR 2007, (ACM, New York, NY, USA), pp. 607-614.
Dolan, R. J. "Emotion, Cognition, and Behavior", Science AAAS, vol. 298, No. 5596, Nov. 2002, pp. 1191-1194.
Dodds, Peter. "Measuring the Happiness of Large-Scale Written Expression: Songs, Blogs, and Presidents", J Happiness Stud. (2010) 11: pp. 441-456.
Damasio, A. R. "Error : Emotion, Reason, and the Human Brain", (Putnam), 1994, pp. xix, 312. 1994.
Nofsinger, J. "Social Mood and Financial Economics", Journal of Behaviour Finance. 6, No. 3, 2005, pp. 144-160.
Edmans, A, Garca, D, & Norli, "Sports Sentiment and Stock Returns", Journal of Finance 62, No. 4, Aug. 2007, pp. 1967-1998.

Hirshleifer, D & Shumway, T. "Good Day Sunshire: Stock Returns and the Weather", Journal of Finance vol. 58, No. 3, Jan. 2012, pp. 1009-1032.
Pak, A & Paroubek, P. Twitter as a Corpus for Sentiment Analysis and Opinion Mining, European Language Resources Association, (ELRA), Valletta, Malta, (2010), pp. 1320-1326.
Pang, B & Lee, L. "Opinion Mining and Sentiment Analysis", Foundations and Trends in Information Retrieval 2, 1008, pp. 1-135.
Wilson, T, Wiebe, J, & Hoffmann, P. "Recognizing Contextual Polarity in Phrase-Level Sentiment Analysis", Prpoceedings of Human Language Technology Conference and Conference on Empirical Methods in National Language, Oct. 2005, (Vancouver, CA), pp. 347-354.
Wilson, T, Hoffmann, P, Somasundaran, S, Kessler, J, Wiebe, J, Choi, Y, Cardie, C, Riloff, E, & Patwardhan, S. "OpinionFinder: A System for Subjectivity Analysis", Proceedings of HLT/EMNLP, Oct. 2005. pp. 34-35.
O'Connor, B, Balasubramanyan, R, Routledge, B. R, & Smith, N. A., "From Tweets to Polls: Linking Text Sentiment to Public Opinion Time Series", Proceedings of the Fourth International AAAI Conference on Weblogs and Social Media, 2010, pp. 122-129.
Diener E, Diener M & Diener D "Factors Predicting the Subjective Well-Being of Nations", Journal of Personality and Social Psychology, vol. 69, No. 5, 1995, pp. 851-864.
Lapedes, A & Farber, R. "Nonlinear Signal Processing Using Neural Networks: Prediction and System Modelling", Prediction and system modeling, (Los Alamos National Lab Technical Report), Jun. 1987, pp. 1-50.
Zhu, X, Wang, H, Xu, L, & Li, H., Expert Syst. Appl. 34, 2008, pgs. 3043-3054.
Leng, G, Prasad, G, & McGinnity, T. M. "An on-line Algorithm for Creating Self-Organizing Fuzzy Neural Networks", (2004) Neural Network 17, 2004, pp. 1477-1493.
Mao, H, Zeng, X.-J, Leng, G, Zhai, Y, & Keane, A. J. IEEE Transaction on Power System. 24, 2009, pp. 1080-1090.
Norcross, J. C, Guadagnoli, E, & Prochaska, J. O. Journal of Clinical Psychology 40, 2006, pp. 1270-1277.
McNair, D, Heuchert, J. P, & Shilony, E. "Profile of mood states" Bibliography, Multi-Health Systems, 2003, pp. 1964-2002.
Pepe, A & Bollen, J. "Between Conjecture and Memento: Shaping a Collective Emotional Perception of the Future", Association for the Advancement of Artifical Intelligence, 2008, pp. 1-6.
Brants, T & Franz, A. "Web 1t 5-gram", version 1, Linguistic Data Consortium, Philadelphia, (2006).
Bergsma, S, Lin, D & Goebel, R "Web-Scale N-gram Models for Lexical Disambiguation", IJCAI'09: Proceedings of the 21st international jont conference on Artifical intelligence, San Francisco, CA., 2009, pp. 1507-1512.
Riloff, E, Wiebe, J, & Wilson, T., "Learning Subjective Nouns Using Extraction Pattern Bootstrapping", (Association for Computational Linguistics, Morristown, NJ, USA, 2003, pp. 25-32.
Riloff, E & Wiebe, J., "Learning Extraction Patterns for Subjective Expressions", Association for Computational Linguistics, Morristown, NJ, USA, 2003, pp. 105-112.
Kahneman, D & Tversky, Amos, Prospect Theory: An Analysis of Decision Under Risk, Econometrica, vol. 47, No. 2, Mar. 1979, pp. 263-291.
Frey, B. S. "Happiness: A Revolution in Economics", The MIT Press, (2008).

* cited by examiner

Table 1: Multiple Regression Results for OpinionFinder vs. 6 GPOMS mood dimensions.

| Parameters | Coeff. | Std.Err. | t | p |
|---|---|---|---|---|
| Calm ($X_1$) | 1.731 | 1.348 | 1.284 | 0.20460 |
| Alert ($X_2$) | 0.199 | 2.319 | 0.086 | 0.932 |
| Sure ($X_3$) | 3.897 | 0.613 | 6.356 | 4.25e-08 ⋆⋆⋆ |
| Vital ($X_4$) | 1.763 | 0.595 | 2.965 | 0.004⋆⋆ |
| Kind ($X_5$) | 1.687 | 1.377 | 1.226 | 0.226 |
| Happy ($X_6$) | 2.770 | 0.578 | 4.790 | 1.30e-05 ⋆⋆ |

| Summary | Residual Std.Err | Adj.$R^2$ | $F_{6,55}$ | p |
|---|---|---|---|---|
| | 0.078 | 0.683 | 22.93 | 2.382e-13 |

(p-value < 0.001: ⋆⋆⋆; p-value < 0.05: ⋆⋆; p-value < 0.1: ⋆)

FIG. 5

Table 2: Statistical significance (p-values) of bivariate Granger-causality correlation between moods and DJIA in period February 28, 2008 to November 3, 2008.

| Lag | OF | Calm | Alert | Sure | Vital | Kind | Happy |
|---|---|---|---|---|---|---|---|
| 1 day | 0.085* | 0.272 | 0.952 | 0.648 | 0.120 | 0.848 | 0.388 |
| 2 days | 0.268 | 0.013** | 0.973 | 0.811 | 0.369 | 0.991 | 0.7061 |
| 3 days | 0.436 | 0.022** | 0.981 | 0.349 | 0.418 | 0.991 | 0.723 |
| 4 days | 0.218 | 0.030** | 0.998 | 0.415 | 0.475 | 0.989 | 0.750 |
| 5 days | 0.300 | 0.036** | 0.989 | 0.544 | 0.553 | 0.996 | 0.173 |
| 6 days | 0.446 | 0.065* | 0.996 | 0.691 | 0.682 | 0.994 | 0.081* |
| 7 days | 0.620 | 0.157 | 0.999 | 0.381 | 0.713 | 0.999 | 0.150 |

(p-value < 0.05: **; p-value < 0.1: *)

FIG. 6

Table 3: DJIA Daily Prediction Using SOFNN

| Evaluation | $I_{OF}$ | $I_0$ | $I_1$ | $I_{1,2}$ | $I_{1,3}$ | $I_{1,4}$ | $I_{1,5}$ | $I_{1,6}$ |
|---|---|---|---|---|---|---|---|---|
| MAPE (%) | 1.95 | 1.94 | 1.83 | 2.03 | 2.13 | 2.05 | 1.85 | 1.79\* |
| Direction (%) | 73.3 | 73.3 | 86.7\* | 60.0 | 46.7 | 60.0 | 73.3 | 80.0 |

PREDICTING ECONOMIC TRENDS VIA NETWORK COMMUNICATION MOOD TRACKING

BACKGROUND

1. Field of Invention

The present invention relates to the monitoring of social networking traffic.

2. Description of Related Art

It is known that emotions can profoundly affect individual behavior and decision-making Studies in behavioral economics exist studying the impact of emotions on an individual's actions. Other studies have relied on one-dimensional models of public mood, measuring a positive versus a negative sentiment, to study the affect of emotions on public actions.

Early research regarding predicting stock market trends was based on random walk theory and an Efficient Market Hypothesis (EMH), supporting a proposition that stock market prices are in great part driven by new information such as news rather than present and past prices. As news is unpredictable, and as stock market prices were believed to follow a random walk pattern, the proposition led to a theory that the prices cannot be predicted with more than fifty percent accuracy.

However, numerous studies have shown that stock market prices may be predicted to a degree that is more than 50 percent and do not follow a random walk pattern. The studies have not investigated public mood from a multi-dimensional model approach to derive information with which to, in particular, predict stock market trends.

What is needed is an improvement over the foregoing.

SUMMARY

The present disclosure provides a method of investigating public mood from a multi-dimensional model approach such that the public mood includes a differentiated relation to economic indicators and a method to predict stock market trends above chance level based on the multi-dimensional model approach. The text-content of several large-scale collections of daily Twitter® posts are analyzed via mood assessment tools including, for example, OpinionFinder ("OF"), measuring a positive mood dimension (versus a negative mood dimension) and Google-Profile of Mood States ("GPOMS"), measuring the following six mood dimensions: calm, alert, sure, vital, kind, and happy. The results may be cross-validated by measuring an ability to measure the public's emotional response to previous highly charged events, such as a presidential election and a holiday. A Granger Causality analysis investigates the correlation between daily changes in public mood states via the OF and GPOMS daily mood time series results with changes in value of the Dow Jones Industrial Average ("DJIA") over time. A Self-Organizing Fuzzy Neural Network ("SOFNN") model may be trained to predict a highly-accurate next-day DJIA value based on a combination of past DJIA values and public mood state measurements across several GPOMS mood dimensions, such as calm and a combination of calm and happy.

In one form thereof, the present disclosure provides a method for predicting economic market trends, including the steps of collecting, via a computer, a plurality of items from a social networking site for a first predetermined time range; filtering, via the computer, the collection of items to create a filtered collection; subjecting, via a processor of the computer, the filtered collection to at least one mood assessment tool to determine at least one mood dimension; assigning a rating, via the processor, to each item of the filtered collection based on the at least one mood dimension; predicting, via the processor, future economic market values based on results from the at least one mood assessment tool and the at least one mood dimension; and displaying, via the processor, the prediction on an output device.

In another form thereof, the present disclosure provides a computer system having a predefined memory bandwidth, a processor, and a computer readable storage medium in connection with the processor, the computer readable storage medium including one or more programming instructions for performing a method of predicting stock market trends, the method including the steps of the above-described method.

In yet another form thereof, the present disclosure provides a computer system for assisting a user in predicting economic market trends, the computer system including a processor and a memory for storing instructions; a collection module in the memory, the collection module including an interface for collecting, via the processor, items from a social networking site for a first predetermined time range; a filtering module in the memory, the filtering module filtering, via the processor, the collection of items to create a filtered collection; a mood assessment module in the memory, the mood assessment module enabling a subjection of the filtered collection to at least one mood assessment tool, the mood assessment tool including at least a rating designated by at least one mood dimension, the mood assessment module sorting a selection of the filtered collection into the rating designated by said mood dimension; a prediction module in the memory, the prediction module predicting, via the processor, future economic market values based on results from the at least one mood assessment tool and the at least one mood dimension; and an output module in the memory, the output module displaying, via the processor, the prediction on an output device.

BRIEF DESCRIPTION OF THE DRAWINGS

The above-mentioned and other features and advantages of this disclosure, and the manner of attaining them, will become more apparent and the invention itself will be better understood by reference to the following descriptions of embodiments of the invention taken in conjunction with the accompanying drawings, wherein:

FIG. 5 is a table, shown as Table I, illustrating results for a multiple regression analysis of moods from a Google-Profile of Mood States mood assessment tool compared against a mood dimension from an OpinionFinder mood assessment tool;

FIG. 6 is a table, shown as Table II, illustrating a correlation between moods and the Dow Jones Industrial Average ("DJIA") during a period ranging from Feb. 28, 2008 to Nov. 3, 2008;

FIG. 9 is a table, shown as Table III, illustrating percentages of error regarding daily DJIA predictions using a Self-organizing Fuzzy Neural Network analysis based on non-linear mood dimension combinations.

Figure 1:
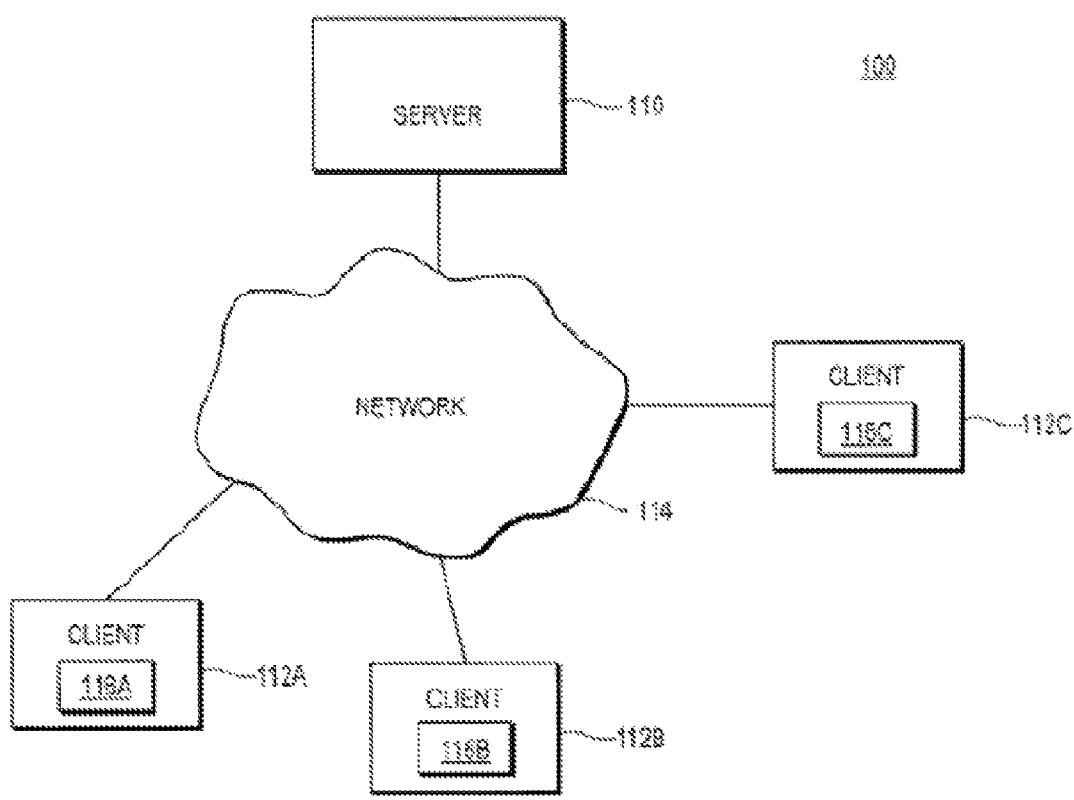
FIG. 1 is a schematic diagrammatic view of a network system in which embodiments of the present invention may be utilized.

Corresponding reference characters indicate corresponding parts throughout the several views. Although the drawings represent embodiments of the present invention, the drawings are not necessarily to scale and certain features may be exaggerated in order to better illustrate and explain the present invention. The flow charts are also representative in nature, and actual embodiments of the invention may include further features or steps not shown in the drawings. The exemplifications set out herein illustrate an exemplary embodiment of the invention, in one form, and such exemplifications are not to be construed as limiting the scope of the disclosure in any manner.

DETAILED DESCRIPTION

The embodiment disclosed below is not intended to be exhaustive or limit the invention to the precise form disclosed in the following detailed description. Rather, the embodiment is chosen and described so that others skilled in the art may utilize its teachings.

Disclosed is a reliable and scalable way to provide an early assessment of the public mood at a time-scale and resolution appropriate for a highly accurate and practical stock market prediction. The provided method is less expensive and less time-consuming to conduct than a large survey of public mood over representative samples of the population, such as a Gallup's opinion poll. For instance, sentiment tracking techniques may now extract reliable indicators of public mood directly from social media such as blogs and Twitter® feeds (Twitter is a registered trademark of Twitter, Inc. of San Francisco, Calif.), which is limited to only 140 characters. Disclosed is a method to utilize such sentiment tracking techniques to predict stock market changes.

The detailed descriptions which follow are presented in part in terms of algorithms and symbolic representations of operations on data bits within a computer memory representing alphanumeric characters or other information. A computer generally includes a processor for executing instructions and memory for storing instructions and data. When a general purpose computer has a series of machine encoded instructions stored in its memory, the computer operating on such encoded instructions may become a specific type of machine, namely a computer particularly configured to perform the operations embodied by the series of instructions. Some of the instructions may be adapted to produce signals that control operation of other machines and thus may operate through those control signals to transform materials far removed from the computer itself. These descriptions and representations are the means used by those skilled in the art of data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic pulses or signals capable of being stored, transferred, transformed, combined, compared, and otherwise manipulated. It proves convenient at times, principally for reasons of common usage, to refer to these signals as bits, values, symbols, characters, display data, terms, numbers, or the like as a reference to the physical items or manifestations in which such signals are embodied or expressed. It should be borne in mind, however, that all of these and similar terms are to be associated with the appropriate physical quantities and are merely used here as convenient labels applied to these quantities.

Some algorithms may use data structures for both inputting information and producing the desired result. Data structures greatly facilitate data management by data processing systems, and are not accessible except through sophisticated software systems. Data structures are not the information content of a memory, rather they represent specific electronic structural elements which impart or manifest a physical organization on the information stored in memory. More than mere abstraction, the data structures are specific electrical or magnetic structural elements in memory which simultaneously represent complex data accurately, often data modeling physical characteristics of related items, and provide increased efficiency in computer operation.

Further, the manipulations performed are often referred to in terms, such as comparing or adding, commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases the distinction between the method operations in operating a computer and the method of computation itself should be recognized. The present invention relates to a method and apparatus for operating a computer in processing electrical or other (e.g., mechanical, chemical) physical signals to generate other desired physical manifestations or signals. The computer operates on software modules, which are collections of signals stored on a media that represents a series of machine instructions that enable the computer processor to perform the machine instructions that implement the algorithmic steps. Such machine instructions may be the actual computer code the processor interprets to implement the instructions, or alternatively may be a higher level coding of the instructions that is interpreted to obtain the actual computer code. The software module may also include a hardware component, wherein some aspects of the algorithm are performed by the circuitry itself rather as a result of a instruction.

The present invention also relates to an apparatus for performing these operations. This apparatus may be specifically constructed for the required purposes or it may comprise a general purpose computer as selectively activated or reconfigured by a computer program stored in the computer. The algorithms presented herein are not inherently related to any particular computer or other apparatus unless explicitly indicated as requiring particular hardware. In some cases, the computer programs may communicate or relate to other programs or equipments through signals configured to particular protocols which may or may not require specific hardware or programming to interact. In particular, various general purpose machines may be used with programs written in accordance with the teachings herein, or it may prove more convenient to construct more specialized apparatus to perform the required method steps. The required structure for a variety of these machines will appear from the description below.

The present invention may deal with "object-oriented" software, and particularly with an "object-oriented" operating system. The "object-oriented" software is organized into "objects", each comprising a block of computer instructions describing various procedures ("methods") to be performed in response to "messages" sent to the object or "events" which occur with the object. Such operations include, for example, the manipulation of variables, the activation of an object by an external event, and the transmission of one or more messages to other objects.

Messages are sent and received between objects having certain functions and knowledge to carry out processes. Messages are generated in response to user instructions, for example, by a user activating an icon with a "mouse" pointer generating an event. Also, messages may be generated by an object in response to the receipt of a message. When one of the objects receives a message, the object carries out an operation (a message procedure) corresponding to the message and, if necessary, returns a result of the operation. Each object has a region where internal states (instance variables) of the object itself are stored and where the other objects are not allowed to access. One feature of the object-oriented system is inheritance. For example, an object for drawing a "circle" on a display may inherit functions and knowledge from another object for drawing a "shape" on a display.

A programmer "programs" in an object-oriented programming language by writing individual blocks of code each of which creates an object by defining its methods. A collection of such objects adapted to communicate with one another by means of messages comprises an object-oriented program. Object-oriented computer programming facilitates the modeling of interactive systems in that each component of the system can be modeled with an object, the behavior of each component being simulated by the methods of its corresponding object, and the interactions between components being simulated by messages transmitted between objects.

An operator may stimulate a collection of interrelated objects comprising an object-oriented program by sending a message to one of the objects. The receipt of the message may cause the object to respond by carrying out predetermined functions which may include sending additional messages to one or more other objects. The other objects may in turn carry out additional functions in response to the messages they receive, including sending still more messages. In this manner, sequences of message and response may continue indefinitely or may come to an end when all messages have been responded to and no new messages are being sent. When modeling systems utilizing an object-oriented language, a programmer need only think in terms of how each component of a modeled system responds to a stimulus and not in terms of the sequence of operations to be performed in response to some stimulus. Such sequence of operations naturally flows out of the interactions between the objects in response to the stimulus and need not be preordained by the programmer.

Although object-oriented programming makes simulation of systems of interrelated components more intuitive, the operation of an object-oriented program is often difficult to understand because the sequence of operations carried out by an object-oriented program is usually not immediately apparent from a software listing as in the case for sequentially organized programs. Nor is it easy to determine how an object-oriented program works through observation of the readily apparent manifestations of its operation. Most of the operations carried out by a computer in response to a program are "invisible" to an observer since only a relatively few steps in a program typically produce an observable computer output.

In the following description, several terms which are used frequently have specialized meanings in the present context. The term "object" relates to a set of computer instructions and associated data which can be activated directly or indirectly by the user. The terms "windowing environment", "running in windows", and "object oriented operating system" are used to denote a computer user interface in which information is manipulated and displayed on a video display such as within bounded regions on a raster scanned video display. The terms "network", "local area network", "LAN", "wide area network", or "WAN" mean two or more computers which are connected in such a manner that messages may be transmitted between the computers. In such computer networks, typically one or more computers operate as a "server", a computer with large storage devices such as hard disk drives and communication hardware to operate peripheral devices such as printers or modems. Other computers, termed "workstations", provide a user interface so that users of computer networks can access the network resources, such as shared data files, common peripheral devices, and inter-workstation communication. Users activate computer programs or network resources to create "processes" which include both the general operation of the computer program along with specific operating characteristics determined by input variables and its environment. Similar to a process is an agent (sometimes called an intelligent agent), which is a process that gathers information or performs some other service without user intervention and on some regular schedule. Typically, an agent, using parameters typically provided by the user, searches locations either on the host machine or at some other point on a network, gathers the information relevant to the purpose of the agent, and presents it to the user on a periodic basis.

The term "desktop" means a specific user interface which presents a menu or display of objects with associated settings for the user associated with the desktop. When the desktop accesses a network resource, which typically requires an application program to execute on the remote server, the desktop calls an Application Program Interface, or "API", to allow the user to provide commands to the network resource and observe any output. The term "Browser" refers to a program which is not necessarily apparent to the user, but which is responsible for transmitting messages between the desktop and the network server and for displaying and interacting with the network user. Browsers are designed to utilize a communications protocol for transmission of text and graphic information over a worldwide network of computers, namely the "World Wide Web" or simply the "Web". Examples of Browsers compatible with the present invention include the Internet Explorer program sold by Microsoft Corporation (Internet Explorer is a trademark of Microsoft Corporation), the Opera Browser program created by Opera Software ASA, or the Firefox browser program distributed by the Mozilla Foundation (Firefox is a registered trademark of the Mozilla Foundation). Although the following description details such operations in terms of a graphic user interface of a Browser, the present invention may be practiced with text based interfaces, or even with voice or visually activated interfaces, that have many of the functions of a graphic based Browser.

Browsers display information which is formatted in a Standard Generalized Markup Language ("SGML") or a Hyper-Text Markup Language ("HTML"), both being scripting languages which embed non-visual codes in a text document through the use of special ASCII text codes. Files in these formats may be easily transmitted across computer networks, including global information networks like the Internet, and allow the Browsers to display text, images, and play audio and video recordings. The Web utilizes these data file formats to conjunction with its communication protocol to transmit such information between servers and workstations. Browsers may also be programmed to display information provided in an eXtensible Markup Language ("XML") file, with XML files being capable of use with several Document Type Definitions ("DTD") and thus more general in nature than SGML or HTML. The XML file may be analogized to an object, as the data and the stylesheet formatting are separately contained (formatting may be thought of as methods of displaying information, thus an XML file has data and an associated method).

The terms "personal digital assistant" or "PDA", as defined above, means any handheld, mobile device that combines computing, telephone, fax, e-mail and networking features. The terms "wireless wide area network" or "WWAN" mean a wireless network that serves as the medium for the transmission of data between a handheld device and a computer. The term "synchronization" means the exchanging of information between a first device, e.g. a handheld device, and a second device, e.g. a desktop computer, either via wires or wirelessly. Synchronization ensures that the data on both devices are identical (at least at the time of synchronization).

In wireless wide area networks, communication primarily occurs through the transmission of radio signals over analog, digital cellular, or personal communications service ("PCS") networks. Signals may also be transmitted through microwaves and other electromagnetic waves. At the present time, most wireless data communication takes place across cellular systems using second generation technology such as code-division multiple access ("CDMA"), time division multiple access ("TDMA"), the Global System for Mobile Communications ("GSM"), Third Generation (wideband or "3G"), Fourth Generation (broadband or "4G"), personal digital cellular ("PDC"), or through packet-data technology over analog systems such as cellular digital packet data (CDPD") used on the Advance Mobile Phone Service ("AMPS").

The terms "wireless application protocol" or "WAP" mean a universal specification to facilitate the delivery and presentation of web-based data on handheld and mobile devices with small user interfaces. "Mobile Software" refers to the software operating system which allows for application programs to be implemented on a mobile device such as a mobile telephone or PDA. Examples of Mobile Software are Java® and Java ME®, (Java and JavaME are trademarks of Sun Microsystems, Inc. of Santa Clara, Calif.), BREW® (BREW is a registered trademark of Qualcomm Incorporated of San Diego, Calif.), Windows Mobile® (Windows is a registered trademark of Microsoft Corporation of Redmond, Wash.), Palm OS® (Palm is a registered trademark of Palm, Inc. of Sunnyvale, Calif.), Symbian OS® (Symbian is a registered trademark of Symbian Software Limited Corporation of London, United Kingdom), ANDROID OS® (ANDROID is a registered trademark of Google, Inc. of Mountain View, Calif.), and iPhone OS® (iPhone is a registered trademark of Apple, Inc. of Cupertino, Calif.). "Mobile Apps" refers to software programs written for execution with Mobile Software.

In the following specification, the term "social network" may be used to refer to a multiple user computer software system that allows for relationships among and between users (individuals or members) and content assessable by the system. Generally, a social network is defined by the relationships among groups of individuals, and may include relationships ranging from casual acquaintances to close familial bonds. In addition, members may be other entities that may be linked with individuals. The logical structure of a social network may be represented using a graph structure. Each node of the graph may correspond to a member of the social network, or content assessable by the social network. Edges connecting two nodes represent a relationship between two individuals. In addition, the degree of separation between any two nodes is defined as the minimum number of hops required to traverse the graph from one node to the other. A degree of separation between two members is a measure of relatedness between the two members.

Social networks may comprise any of a variety of suitable arrangements. An entity or member of a social network may have a profile and that profile may represent the member in the social network. The social network may facilitate interaction between member profiles and allow associations or relationships between member profiles. Associations between member profiles may be one or more of a variety of types, such as friend, co-worker, family member, business associate, common-interest association, and common-geography association. Associations may also include intermediary relationships, such as friend of a friend, and degree of separation relationships, such as three degrees away. Associations between member profiles may be reciprocal associations. For example, a first member may invite another member to become associated with the first member and the other member may accept or reject the invitation. A member may also categorize or weigh the association with other member profiles, such as, for example, by assigning a level to the association. For example, for a friendship-type association, the member may assign a level, such as acquaintance, friend, good friend, and best friend, to the associations between the member's profile and other member profiles.

Each profile within a social network may contain entries, and each entry may comprise information associated with a profile. Examples of entries for a person profile may comprise contact information such as an email addresses, mailing address, instant messaging (or IM) name, or phone number; personal information such as relationship status, birth date, age, children, ethnicity, religion, political view, sense of humor, sexual orientation, fashion preferences, smoking habits, drinking habits, pets, hometown location, passions, sports, activities, favorite books, music, TV, or movie preferences, favorite cuisines; professional information such as skills, career, or job description; photographs of a person or other graphics associated with an entity; or any other information or documents describing, identifying, or otherwise associated with a profile. Entries for a business profile may comprise industry information such as market sector, customer base, location, or supplier information; financial information such as net profits, net worth, number of employees, stock performance; or other types of information and documents associated with the business profile.

A member profile may also contain rating information associated with the member. For example, the member may be rated or scored by other members of the social network in specific categories, such as humor, intelligence, fashion, trustworthiness, sexiness, and coolness. A member's category ratings may be contained in the member's profile. In one embodiment of the social network, a member may have fans. Fans may be other members who have indicated that they are "fans" of the member. Rating information may also include the number of fans of a member and identifiers of the fans. Rating information may also include the rate at which a member accumulated ratings or fans and how recently the member has been rated or acquired fans.

A member profile may also contain social network activity data associated with the member. Membership information may include information about a member's login patterns to the social network, such as the frequency that the member logs in to the social network and the member's most recent login to the social network. Membership information may also include information about the rate and frequency that a member profile gains associations to other member profiles. In a social network that comprises advertising or sponsorship, a member profile may contain consumer information. Consumer information may include the frequency, patterns, types, or number of purchases the member makes, or information about which advertisers or sponsors the member has accessed, patronized, or used.

A member profile may comprise data stored in memory. The profile, in addition to comprising data about the member, may also comprise data relating to others. For example, a member profile may contain an identification of associations or virtual links with other member profiles. In one embodiment, a member's social network profile may comprise a hyperlink associated with another member's profile. In one such association, the other member's profile may contain a reciprocal hyperlink associated with the first member's profile. A member's profile may also contain information excerpted from another associated member's profile, such as a thumbnail image of the associated member, his or her age, marital status, and location, as well as an indication of the number of members with which the associated member is associated. In one embodiment, a member's profile may comprise a list of other social network members' profiles with which the member wishes to be associated.

An association may be designated manually or automatically. For example, a member may designate associated members manually by selecting other profiles and indicating an association that may be recorded in the member's profile. According to one embodiment, associations may be established by an invitation and an acceptance of the invitation. For example, a first user may send an invitation to a second user inviting the second user to form an association with the first user. The second user may accept or reject the invitation. According to one embodiment, if the second user rejects the invitation, a one-way association may be formed between the first user and the second user. According to another embodiment, if the second user rejects the association, no association may be formed between the two users. Also, an association between two profiles may comprise an association automatically generated in response to a predetermined number of common entries, aspects, or elements in the two members' profiles. In one embodiment, a member profile may be associated with all of the other member profiles comprising a predetermined number or percentage of common entries, such as interests, hobbies, likes, dislikes, employers and/or habits. Associations designated manually by members of the social network, or associations designated automatically based on data input by one or more members of the social network, may be referred to as user established associations.

Examples of social networks include, but are not limited to, Facebook®, Twitter®, MySpace®, LinkedIn®, and other systems. The exact terminology of certain features, such as associations, fans, profiles, etc. may vary from social network to social network, although there are several functional features that are common to the various terms. Thus, a particular social network may have more of less of the common features described above. In terms of the following disclosure, generally the use of the term "social network" encompasses a system that includes one or more of the foregoing features or their equivalents.

FIG. 1 is a high-level block diagram of a computing environment 100 according to one embodiment. FIG. 1 illustrates server 110 and three clients 112 connected by network 114. Only three clients 112 are shown in FIG. 1 in order to simplify and clarify the description. Embodiments of the computing environment 100 may have thousands or millions of clients 112 connected to network 114, for example the Internet. Users (not shown) may operate software 116 on one of clients 112 to both send and receive messages through network 114 via server 110 and its associated communications equipment and software (not shown).

Figure 2:
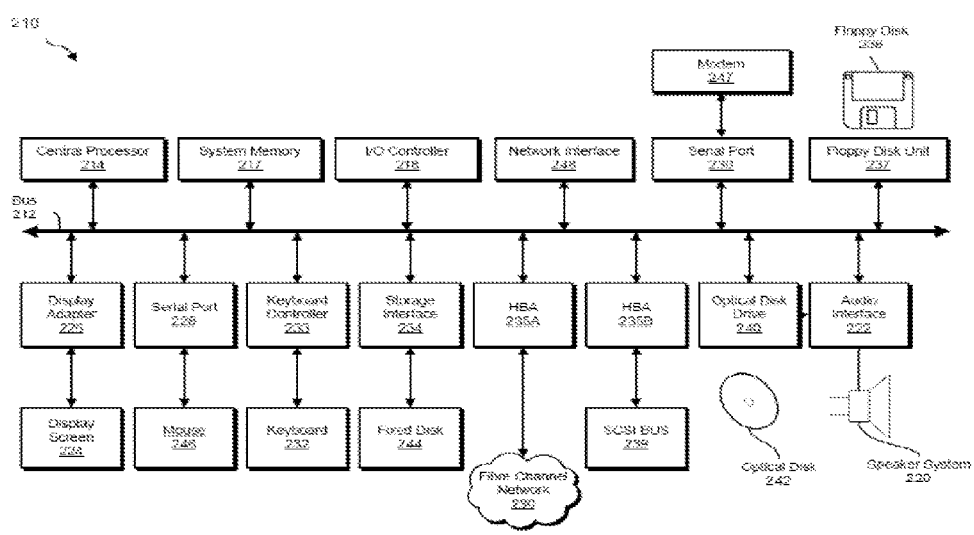
FIG. 2 is a block diagram of a computing system (either a server or client, or both, as appropriate), with optional input devices (e.g., keyboard, mouse, touch screen, etc.) and output devices, hardware, network connections, one or more processors, and memory/storage for data and modules, etc., which may be utilized in conjunction with embodiments of the present invention.

FIG. 2 depicts a block diagram of computer system 210 suitable for implementing server 110 or client 112. Computer system 210 includes bus 212 which interconnects major subsystems of computer system 210, such as central processor 214, system memory 217 (typically RAM, but which may also include ROM, flash RAM, or the like), input/output controller 218, external audio device, such as speaker system 220 via audio output interface 222, external device, such as display screen 224 via display adapter 226, serial ports 228 and 230, keyboard 232 (interfaced with keyboard controller 233), storage interface 234, disk drive 237 operative to receive floppy disk 238, host bus adapter (HBA) interface card 235A operative to connect with Fibre Channel network 290, host bus adapter (HBA) interface card 235B operative to connect to SCSI bus 239, and optical disk drive 240 operative to receive optical disk 242. Also included are mouse 246 (or other point-and-click device, coupled to bus 212 via serial port 228), modem 247 (coupled to bus 212 via serial port 230), and network interface 248 (coupled directly to bus 212).

Bus 212 allows data communication between central processor 214 and system memory 217, which may include read-only memory (ROM) or flash memory (neither shown), and random access memory (RAM) (not shown), as previously noted. RAM is generally the main memory into which operating system and application programs are loaded. ROM or flash memory may contain, among other software code, Basic Input-Output system (BIOS) which controls basic hardware operation such as interaction with peripheral components. Applications resident with computer system 210 are generally stored on and accessed via computer readable media, such as hard disk drives (e.g., fixed disk 244), optical drives (e.g., optical drive 240), floppy disk unit 237, or other storage medium. Additionally, applications may be in the form of electronic signals modulated in accordance with the application and data communication technology when accessed via network modem 247 or interface 248 or other telecommunications equipment (not shown).

Storage interface 234, as with other storage interfaces of computer system 210, may connect to standard computer readable media for storage and/or retrieval of information, such as fixed disk drive 244. Fixed disk drive 244 may be part of computer system 210 or may be separate and accessed through other interface systems. Modem 247 may provide direct connection to remote servers via telephone link or the Internet via an internet service provider (ISP) (not shown). Network interface 248 may provide direct connection to remote servers via direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure.

Devices and subsystems may be interconnected in different ways from that shown in FIG. 2. Operation of a computer system such as that shown in FIG. 2 is readily known in the art and is not discussed in detail in this application. Software source and/or object codes to implement the present disclosure may be stored in computer-readable storage media such as one or more of system memory 217, fixed disk 244, optical disk 242, or floppy disk 238. The operating system provided on computer system 210 may be a variety or version of either MS-DOS® (MS-DOS is a registered trademark of Microsoft Corporation of Redmond, Wash.), WINDOWS® (WINDOWS is a registered trademark of Microsoft Corporation of Redmond, Wash.), OS/2® (OS/2 is a registered trademark of International Business Machines Corporation of Armonk, N.Y.), UNIX® (UNIX is a registered trademark of X/Open Company Limited of Reading, United Kingdom), Linux® (Linux is a registered trademark of Linus Torvalds of Portland, Oreg.), or other known or developed operating system.

Moreover, regarding the signals described herein, those skilled in the art recognize that a signal may be directly transmitted from a first block to a second block, or a signal may be modified (e.g., amplified, attenuated, delayed, latched, buffered, inverted, filtered, or otherwise modified) between blocks. Although the signals of the above described embodiments are characterized as transmitted from one block to the next, other embodiments of the present disclosure may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

A method of investigating public mood uses a multi-dimensional model approach, and the public mood includes a differentiated relation to economic indicators via this approach. Further, economic market trends, such as stock market trends, may be predicted with accuracy above chance level based on the multi-dimensional model approach. In one embodiment of a mood assessment tool, the text-content of several large-scale collections of network communications, for example daily Twitter® posts, or tweets, are analyzed. Such mood assessment tools may include, for example, OpinionFinder ("OF"), measuring a positive mood dimension (versus a negative mood dimension) and Google-Profile of Mood States ("GPOMS"), measuring the following six mood dimensions: calm, alert, sure, vital, kind, and happy. Other mood assessment tools, now known or later developed, may be used to investigate the public mood for economic market prediction. Further other types of network communications may be used, such as e-mails, profile updates, web site notices, blogs, and the like.

OF is a publicly available software package allowing for sentiment analysis applicable to determine subjectivity at a sentence level. For example, subjective sentences of a text may be identified as well as the polarity (determined as positive or negative) of these sentences. Using OF's previously established subjective lexicon indicating weak and strong positive and negative words, it may be determined for each tweet whether the tweet contains more positive than negative OF lexicon terms to determine whether the content is indicative of a positive or negative OF sentiment. A sentiment score for a group of tweets posted on a same day t is the ratio of the positive vs. negative messages for that day.

While OF is an example of a mood assessment tool that measures a single mood dimension (either positive or negative), GPOMS is an example of a mood assessment tool that measures a multi-dimensional structure of public mood including the following mood dimensions: calm, alert, sure, vital, kind, and happy. The calm mood dimension measures between lexicon indicating a composed sentiment versus an anxious sentiment. The alert mood dimension measures between lexicon indicating a clearheaded sentiment versus a confused sentiment. The sure mood dimension measures between lexicon indicating a confident sentiment versus an unsure sentiment. The vital mood dimension measures between lexicon indicating an energetic sentiment versus a tired sentiment. The kind mood dimension measures between lexicon indicating an agreeable sentiment versus a hostile sentiment. The happy mood dimensions measures between lexicon indicating an elated mood sentiment and a depressed mood sentiment. Alternative definitions of mood dimensions, now known or later developed, may be used as part of the disclosed multi-dimensional mood analysis.

The GPOMS mood dimensions and lexicon are inspired by the Profile of Mood States ("POMS"), a psychometric instrument. In an exemplary embodiment, to apply POMS to a Twitter® mood analysis, the original 72 terms of POMS may be expanded to a greater lexicon of associated terms by means of information derived from large-scale online text resources. The terms used in each tweet may then be matched against this expanded lexicon and mapped to their respective POMS mood dimensions and, hence, GPOMS mood dimensions, as described above. Alternatively, the method described herein may not utilize POMS lexicon, and may instead directly extract terms from Twitter® feeds.

The results may be cross-validated by measuring an ability to measure the public's emotional response to previous highly charged events, such as a presidential election and a holiday. A Granger Causality analysis investigates the correlation between daily changes in public mood states, via the OF and GPOMS daily mood time series results, with changes in value of a public economic market, as represented by the Dow Jones Industrial Average ("DJIA") over time. A Self-Organizing Fuzzy Neural Network ("SOFNN") model may be trained to predict a highly-accurate next-day DJIA value based on a combination of past JDIA values and public mood state measurements across several GPOMS mood dimensions, such as calm and a combination of calm and happy.

Sentiment tracking techniques may extract reliable indicators of public mood directly from social media items such as blogs and Twitter® feeds, which is limited to only 140 characters. In particular, two tools may be used to measure variations in the public mood from Twitter® feeds, or tweets, during a predetermined time range. For example, for tweets submitted during the predetermined time range of Jan. 1, 2008 to Dec. 19, 2008, a first tool of OF analyzed the text content of tweets submitted on each of the range of days to provide a positive daily time series of public mood (over a negative daily time series). A second tool of GPOMS analyzed the text content of tweets to general a six-dimensional daily time series of public mood including the six mood dimensions of calm, alert, sure, vital, kind, and happy. The resulting public mood dimensions were correlated to the DJIA to assess the ability of each of the dimensions alone or in combination to predict changes in the DJIA overt time. A correlation of the seven mood dimensions derived from the OF and GPOMS tools above indicated that a prediction accuracy of predicting stock market changes is significantly improved when including certain mood dimensions, such as calm and happy, but not when including others, such as positive as measured by the OF tool, as described in detail in the descriptions of the tests below.

Figure 10:
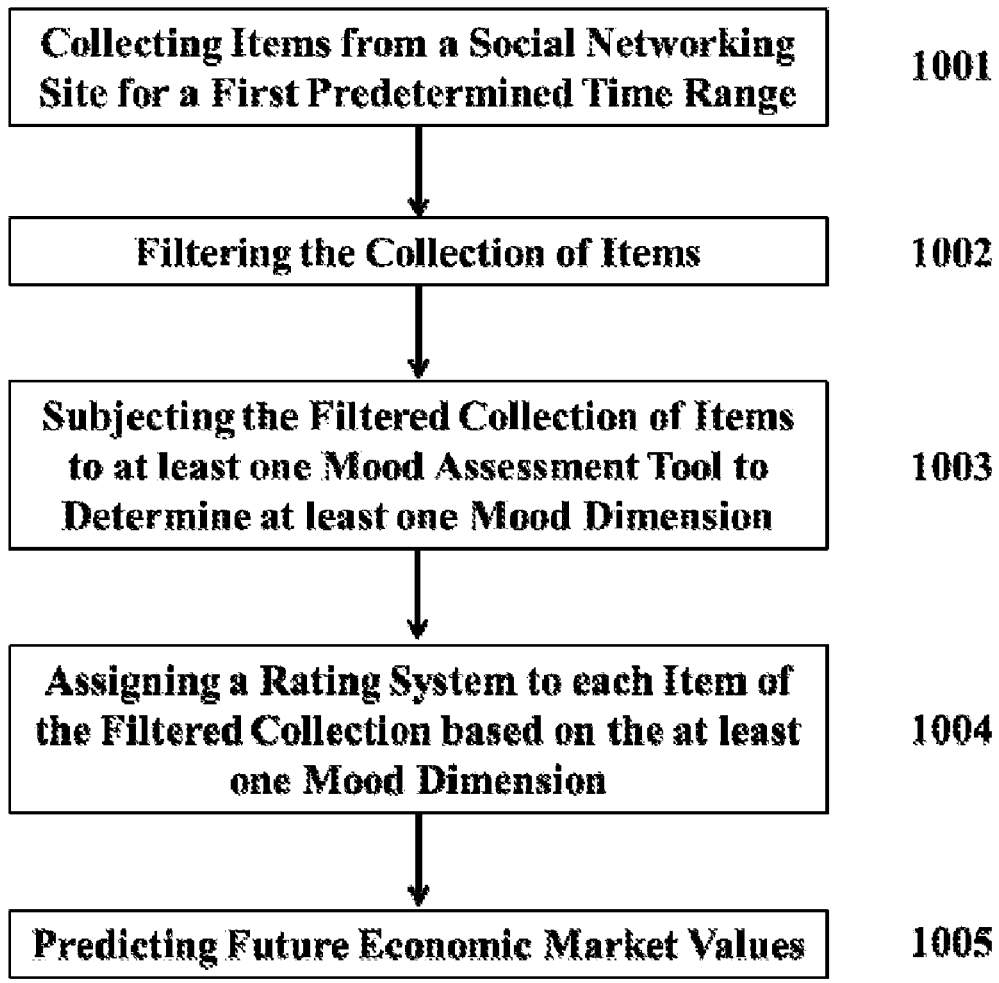
FIG. 10 is a flowchart illustrating steps of a method for predicting stock market trends.

Thus, referring to FIG. 10, a method for predicting economic market trends, such as stock market trends, is shown. Items such as postings from a social networking site for a first predetermined time range are collected in step 1001 via a processor. In one embodiment, the processor may be implemented at the server side. The server may thus be the same server as that for a communications network or social network, or a server for a communications hub used by the communications network or social network, such that items such as communications and/or postings on are collected and observed via the server. For example, referring to FIG. 2, central processor 214 may thus be implemented at server 110 (FIG. 1) to retrieve communications and/or postings directly from server 110, or from communications routing through server 110. In an alternative embodiment, the processor may be implemented at the client side, such that communications and/or postings on the social network may be observed on the client side through public channels. Processing decisions may thus sent through network 114 to access server 110 to retrieve the required information and/or documents relating to such communications and/or postings from server 110. Referring to FIG. 2, central processor 214 may thus be based at client 116A (FIG. 1), for example, to request information from server 110 via network 114 to which client 116A and server 110 are connected. Server 110 then sends the requested information through network 114 to client 116A for further processing.

The social networking site may be, for example, Twitter® social network site. The collection of items, such as communications and/or postings, from step 1001 are optionally filtered in step 1002 to create a filtered collection, such as the filtered collection described below in Test 1. For example, stop-words and punctuation may be removed from the collection, postings including statements about mood may indicate which postings should remain in the collection, and regular expressions such as "http:" and "www" may indicate removal of certain postings to avoid spam postings in the collection. The communications collection or the filtered collection is subjected, in step 1003, to at least one mood assessment tool to determine at least one mood dimension. For example, the mood assessment tools may include an OpinionFinder ("OF") assessment tool and a Google-Profile of Mood States ("GPMOS") assessment tool.

Each item of the communications collection or filtered collection is then further assigned a rating in step 1004 based on the at least one mood dimension, such as a first through a seventh mood dimension. The first mood dimension may be, for example, positive under the OF tool. The second through seventh mood dimensions may be measured under the GPMOS tool and may be, respectively, calm, alert, sure, vital, kind, and happy. Based on the results of the at least one mood assessment tool and the at least one mood dimension, and via the processor, future economic market values, such as daily stock market values, may be predicted in step 1005. For example, the prediction may be based on results indicating the second mood dimension of calm such that the measurements of calm are used to predict future results to an unexpectedly high degree of accuracy, or above a chance level, as described below. Further, the prediction may be based on results indicating a combination of the second mood dimension of calm and the seventh mood dimension of happy as capable of providing a prediction above a chance level, such that the measurements of calm and happy are used to predict the future results.

Via the processor, future economic market activity, such as daily stock market values, may be predicted for a future predetermined time range based on results from the at least one mood assessment tool. After the future predetermined time range expires and becomes a past event, a time series of actual daily stock market values may be extracted for the now expired future predetermined time range. The actual daily stock market values may be compared to the predicted future daily stock market values of the now expired future predetermined time range, and a percentage error of the predictions may be calculated and displayed on, for example, a computer screen or a like graphical display, and may be conveyed to another system for display and/or use. Alternatively, a time series of actual daily stock market values may be extracted for a previously occurring predetermined time range and the mood assessment tool or tools may be used to assist with predicting previous results for the previously occurring predetermined time range. In this manner, one does not need to wait until a future time frame has expired or past to compared the predicted results with the actual results. Rather, the actual daily stock market values collected for the previously occurring predetermined time range may be compared to the predicted previous results and a percentage error of the predictions may be calculated and conveyed or displayed, as further described below.

Test 1

Figure 3:
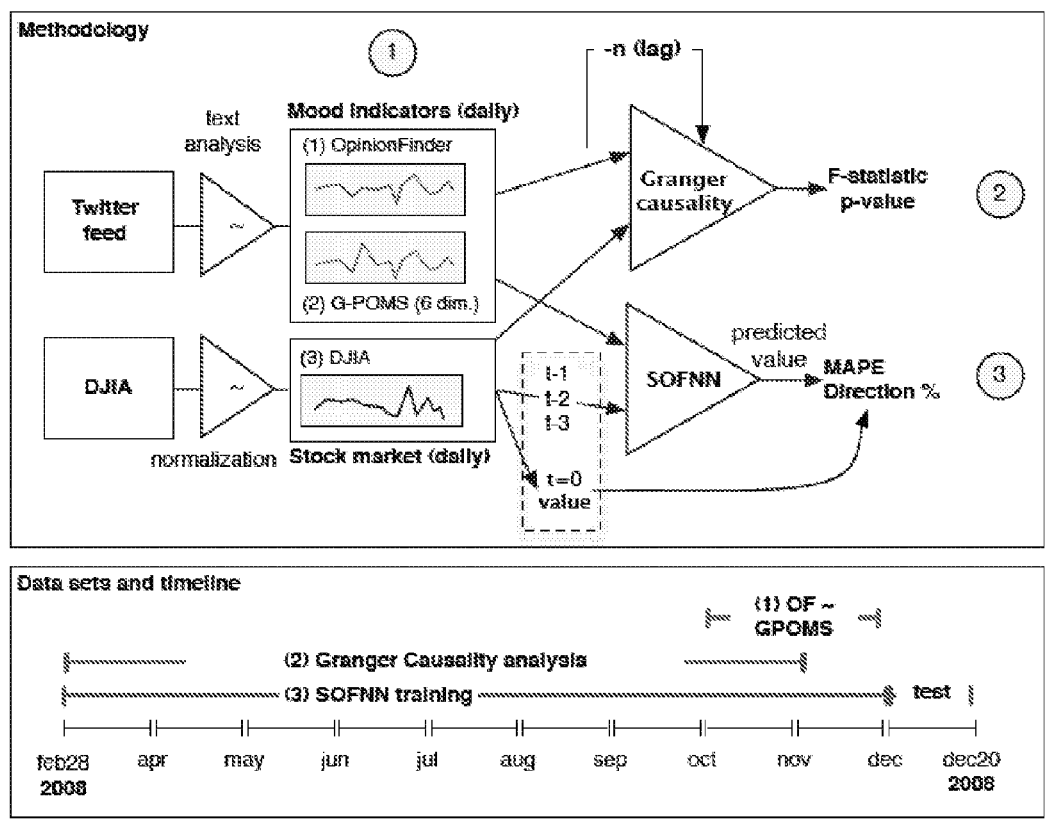
FIG. 3 is a schematic diagram outlining phases of methodology along with corresponding data sets.

A collection of public tweets recorded from Feb. 28, 2008 to Dec. 19, 2008 were obtained, approximately equaling nine million tweets posted by approximately 2.7 million users. Each tweet provided the tweet identifier, the submission date and time (GMT+)), the submission type, and a text content limited to 140 characters. Stop-words and punctuation were then removed from the text content, and the tweets submitted on the same date were grouped together. Only those tweets including explicit statements of an author's mood states were filtered out to create a filtered collection of tweet posts. Such explicit statements included, for example, the expressions "I feel, "I am feeling", "I'm feeling, "I don't feel", "I'm", "Im", "I am, and "makes me". Also removed to avoid spam messages and information-oriented tweets were the expressions "http:" and/or "www." Referring to FIG. 3, the filtered collection of daily tweet posts were then subjected to the OF and GPOMS assessment tools as described above.

Figure 4:
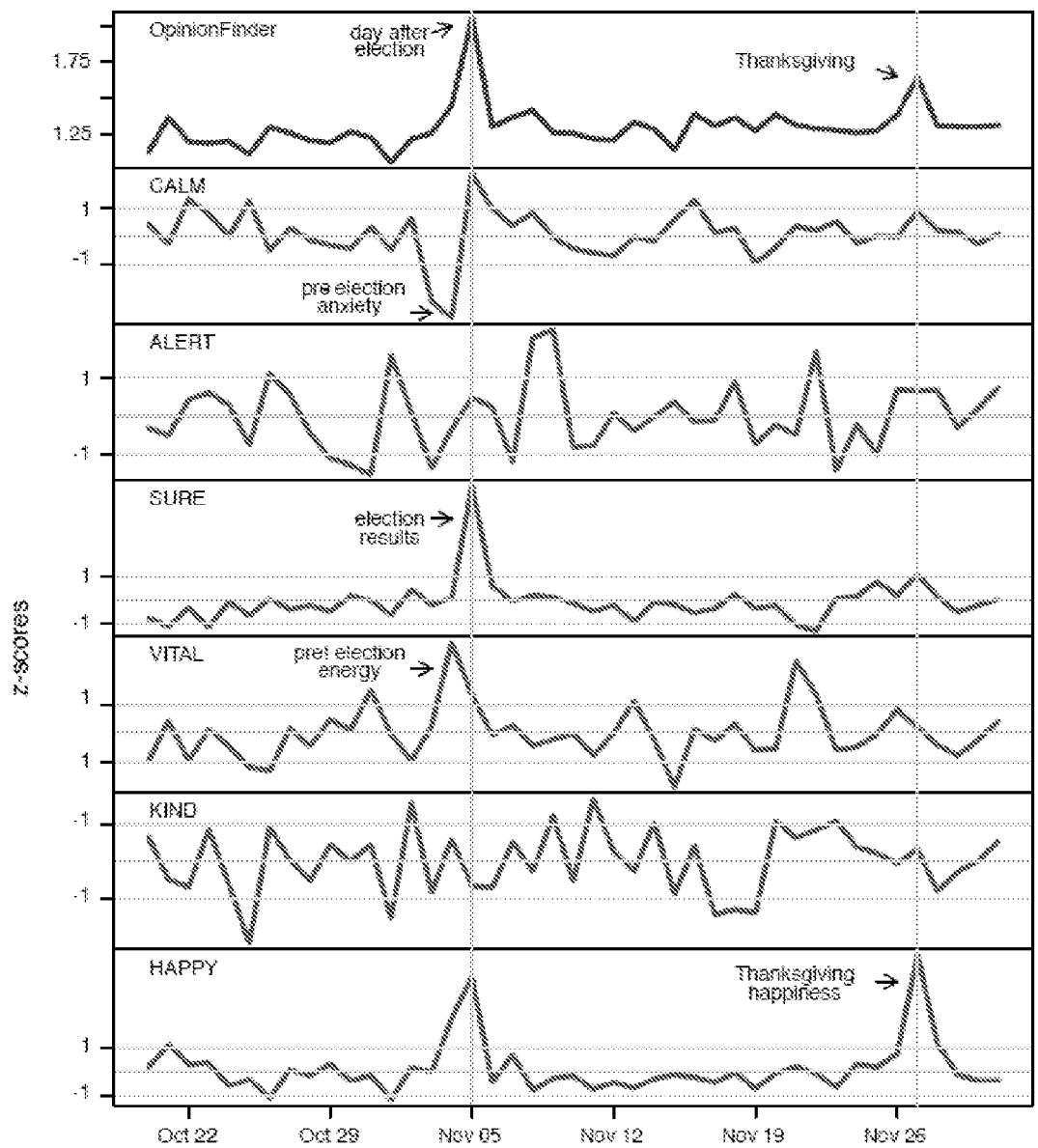
FIG. 4 is a graphical analysis depicting the tracking of public mood states posted in a time period ranging from between October 2008 to December 2008 and including a U.S. Presidential Election day and Thanksgiving Day.

In this example, the OF and GPOMS assessment tools were applied as described above to tweets posted in a three-month period ranging from Oct. 5, 2008 to Dec. 5, 2008, which included significant socio-cultural events such as the U.S. presidential election of Nov. 4, 2008 ("the election day") and Thanksgiving Day ("Thanksgiving", a U.S. national holiday) on Nov. 27, 2008. Referring to FIG. 4, a resulting mood time series resulting from a cross-validation of OF and GPOMS measurements of the tweets against the above-referenced events is shown. The OF shows a positive public response to each of the above-referenced events, as shown in FIG. 4. The GPOMS results are more differentiated and directed to a response to the events during, in particular, a three-day period surrounding the election day. For example, calm is significantly shown to drop the day before the election, indicating a heightened public anxiety level, only to greatly rise on election day to indicate a great reduction in the public anxiety level. Further, increases in vital, happy and kind mood dimension scores, indicate an energized, happy, and friendly public emotion. After the election day, the mood dimensions all appear to gradually return to a baseline. On Thanksgiving, only the happy mood dimension is significantly elevated and only for that day alone.

The GPOMS happy mood dimension, as shown in FIG. 4, appears to best approximate the OF mood trend. However, the relations between the GPOMS mood dimensions and the OF mood trends are quantitatively determined by testing the correlation between the trend obtained from the OF lexicon and the six dimensions of GPOMS using multiple regression, resulting in a finding that the OF mood correlates and trends with sure, vital and happy, but not with calm, alert, and kind. The results of the multiple regression are shown in FIG. 5 (TABLE 1, showing coefficient and p-values). The equation used for the regression model follows:

$$Y_{OF} = \alpha + \sum_{i}^{n} \beta_i X_i + \epsilon_i$$

where $X_1$, $X_2$, $X_3$, $X_4$, $X_5$, and $X_6$ represent the six GPOMS dimensions, respectively calm, alert, sure, vital, kind, and happy. Thus, while certain GPOMS mood dimensions partially overlap with the OF mood dimension, not necessarily all of the mood indicators for an important event overlap with the OF mood dimension (such as the kind mood dimensions, an important mood dimension on election day).

Test 2

Further referring to FIG. 5, a time series of daily DJIA closing-values are extracted from Yahoo! Finance, although another web-based tool could have been used. A Granger Causality analysis was used to test the hypothesis that public mood, as measured by GPOMS and OF, is predictive of future DJIA values. Referring back to FIG. 3, the Granger Causality analysis correlates DJIA values to GPOMs and OF values of the past n days.

The DJIA time series ($D_t$) reflects daily changes in stock market value for the time series selected, or rather, between day t and day t−1: $D_t = DJIA_t - DJIA_{t-1}$. Testing whether the mood time series predicts stock market changes, the variances between the two equations below, as described further below, are compared:

$$L_1 : D_t = \alpha + \sum_{i=1}^{n} \beta_i D_{t-i} + \epsilon_t$$

$$L_1 : D_t = \alpha + \sum_{i=1}^{n} \beta_i D_{t-i} + \sum_{i=1}^{n} \gamma_i X_{t-i} + \epsilon_t$$

Model $L_1$ uses only n lagged values of $D_t$ for prediction (signaled as $D_{t-1}, \ldots, D_{t-n}$) and model $L_2$ uses n lagged values of both $D_t$ and the GPOMS and OF mood time series (denoted as $X_{t-1}, \ldots, X_{t-n}$). The equations above were applied to a period of time ranging from Feb. 28, 2008 to Nov. 3, 2008, avoiding the heightened emotion dates of the election and Thanksgiving as that year and as studied above.

The GPOMS and OF time series were produced from 342, 255 tweets that occurred during the tested period, and the daily DJIA was retrieved from Yahoo! Finance for each day of the tested period. The results of the Granger causality are shown in FIG. 6 (Table II). The results indicate that the calm mood dimension has the highest Granger causality relation with the DJIA for lags ranging from 2 to 6 days, having p-values of less than 0.05. The other GPOMS mood dimensions and OF mood dimension do not have significant causal relations with changes in the stock market.

Figure 7:
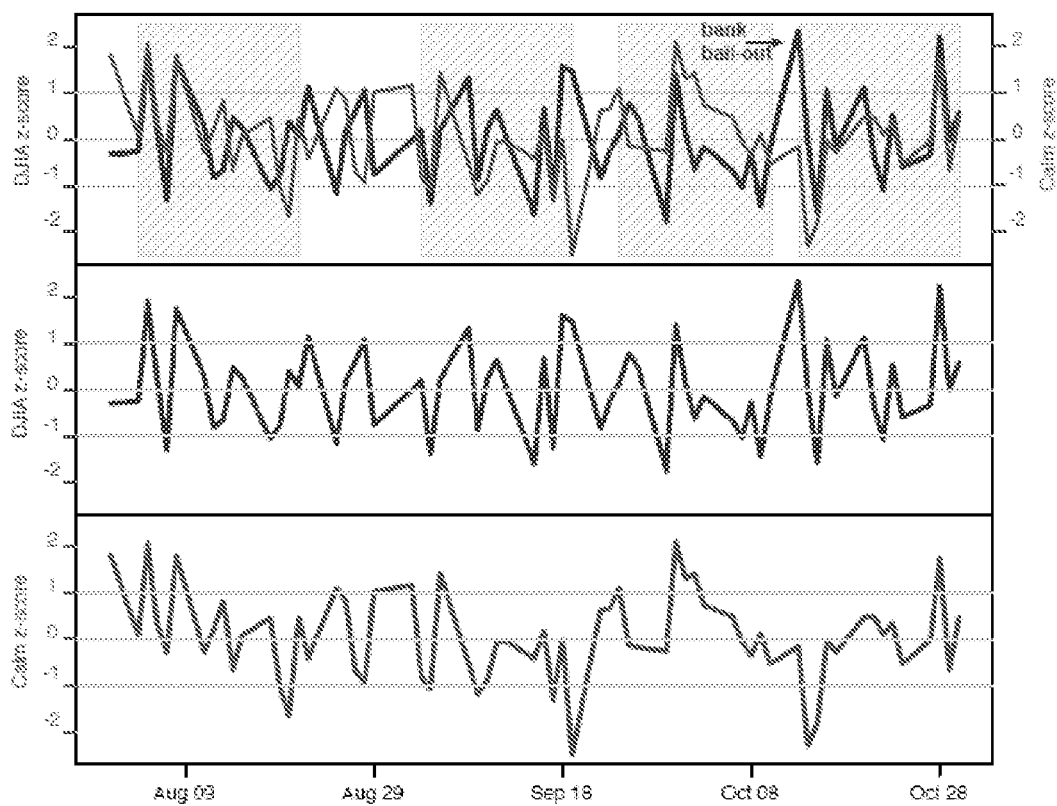
FIG. 7 is a panel of three graphs showing a normalized calm score over a predefined range of time, a normalized DJIA score over a range of time, and the overlap of the two sets of normalized scores.

Referring to FIG. 7, a times series is plotted to show the correlation between the calm mood dimension and the DJIA, where the DJIA delta values $D_t$ and mood index value $X_i$ are converted to z-scores to maintain a same scale according to a local means and standard deviation within a sliding window of k days before and after a given date. For example, the z-score of a time series $D_t$ is defined by the following equation (a similar equation used for the z-score of a time series $X_t$, replacing $D_t$ with $X_t$ in the equation):

$$z_{D_t} = \frac{D_t - x(D_{t \pm k})}{\sigma(D_{t \pm k})}$$

where $x(D_{t \pm k})$ and $\sigma(D_{t \pm k})$ represent the mean and standard deviation of the time series within a period of time of [t−k, t+k]. Such a normalization for both $D_t$ and $X_t$ causes all time series to fluctuate around a zero mean and be expressed on a scale of 1 standard deviation.

Referring back to FIG. 7, both time series frequently overlap and/or point in the same direction. A change in a past value of calm (at t−3) predicts a similar rise or fall of DJIA values (at t=0). Thus, the calm mood dimension has predictive value with respect to the DJIA. Indeed, the p-value for the shorter period shown in FIG. 7 (Aug. 1, 2008 to Oct. 30, 2008), is significantly lower than the data shown in Table II (having for lag n=3, p=0.0009). The discrepancies of FIG. 7 are as important as the similarities, indicating how unexpected news may not be anticipated by a public mood but may still remain a significant factor to predict stock market trends. For instance, on October 13, the DJIA appears to surge by more than 3 standard deviations while the calm curve remains relatively flat and then begins to track the DJIA changes once more. On this date, the Federal Reserve had announced a major bank bailout initiative that unexpectedly increased the DJIA values on that day.

Test 3

Next, referring back to FIG. 3, a Self-Organizing Fuzzy Neural Network ("SOFNN") model was used to test the hypothesis that a prediction accuracy of DJIA prediction models can be improved by including measurements of public mood. Because the above-described Granger causality analysis is based on a linear regression, and the relation between public mood and stock market values was found to be most likely non-linear, a SOFNN model was used as a prediction model since such a model has previously been used to decode nonlinear time series data to describe and predict the characteristics of the stock market. SOFNN is a five-layer hybrid neural network that can self-organize its own neurons and allows for electrical load forecasting. The performance of a SOFNN model was tested via the model predicting DJIA values of the basis of two sets of inputs, including (1) the past 3 days of DJIA values and (2) the same combined with various permutations to the mood time series, as described below.

The SOFNN input attributes include combinations of a DJIA value and mood values of the past n days, used to predict a DJIA value on day t. As the results in Table II indicate that past n=4 days, the Granger causal relation between the calm mood dimension and the DJIA significantly decreases, the value n=3 was chosen. Historical load values were linearly scaled to [0,1], causing every input variation to be processed within a uniform range and treated with similar importance. Similar parameter values were maintained across various input combinations for an unbiased comparison of model performance. The maintained parameter values were δ=0.04, σ=0.01, $k_{rmse}$=0.05, $k_d$(i), (i=1, . . . , r)=0.1 where r is a dimension of input variables and $k_{rmse}$ is the expected training root mean squared error (a predefined value).

Figure 8:
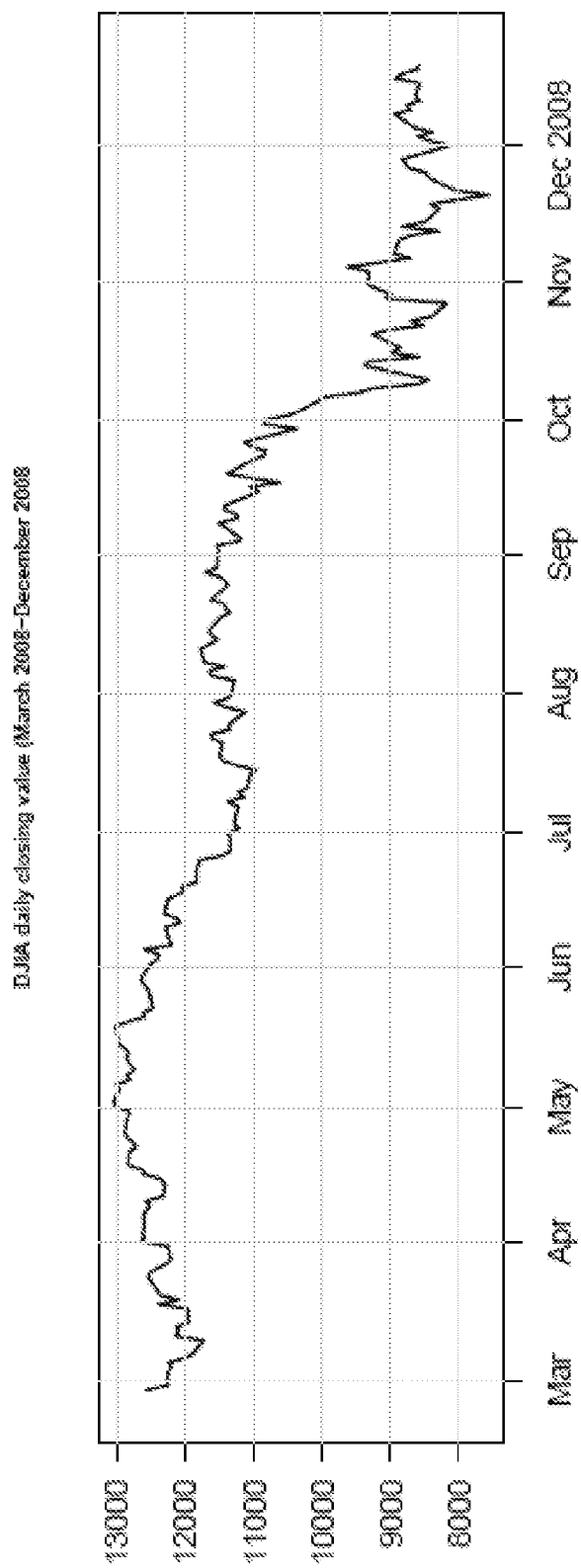
FIG. 8 is a graphical depiction of daily DJIA values during a period ranging from Feb. 28, 2008 to Dec. 19, 2008.

The tested period was now extended to include a time ranging from Feb. 28, 2008 to Dec. 19, 2008, wherein Feb. 28, 2008 to Nov. 28, 2008 was the training period and Dec. 1, 2008 to Dec. 19, 2008 was the model test period. Referring to FIG. 8, DJIA values for the entire tested period, illustrating a sharp decline in the stock market during the 2008 year.

The SOFNN model tests for whether combinations of mood dimensions allow for greater predictability of stock market trends. For instance, the happy mood dimension allow was not shown to have a linear relationship with the DJIA values under the Granger causality analysis to accurately predict trends. However, as the SOFNN model found, and as described below, the happy mood dimension combined with the calm mood dimension may predict stock market trends to a relatively high degree of accuracy (FIG. 9, Table 3), for example, resulting in an 80% accurate prediction.

Seven permutations of input variables to the SOFNN model, denoted as $I_0$, $I_1$, $I_{1,2}$, $I_{1,3}$, $I_{1,4}$, $I_{1,5}$, $I_{1,6}$, were investigated. The first, denoted as $I_0$, represents a baseline model trained to predict DJIA values at time t from the historical values at time {t-1, t-2, t-3}. Thus, where $I_0$={$DJIA_{t-3,2,1}$}, $DJIA_{t-3,2,1}$ represents the DJIA values at time t-3, t-2, and t-1. The equations below calculate the further input variables as listed below, where $X_{1,t-3,2,1}$ represents the values of the GPOMS calm mood dimension at t-3, t-2, and t-1. Similarly represented, $X_2$, $X_3$, $X_4$, $X_5$, and $X_6$, as described above, respectively correspond to the following GPOMS mood dimensions: alert, sure, vital, kind, and happy. Thus, $I_{1,6}$ represents a set of inputs including the DJIA values t-3, t-2, and t-3 and the GPOMS calm and happy mood dimensions at the same time.

$I_1$={$DJIA_{t-3,2,1}$,$X_{1,t-3,2,1}$}

$I_{1,2}$={$DJIA_{t-3,2,1}$,$X_{1,t-3,2,1}$,$X_{2,t-3,2,1}$}

$I_{1,3}$={$DJIA_{t-3,2,1}$,$X_{1,t-3,2,1}$,$X_{3,t-3,2,1}$}

$I_{1,4}$={$DJIA_{t-3,2,1}$,$X_{1,t-3,2,1}$,$X_{4,t-3,2,1}$}

$I_{1,5}$={$DJIA_{t-3,2,1}$,$X_{1,t-3,2,1}$,$X_{5,t-3,2,1}$}

$I_{1,6}$={$DJIA_{t-3,2,1}$,$X_{1,t-3,2,1}$,$X_{6,t-3,2,1}$}

Additionally, the input combination to measure the OF mood dimension used the equation below:

$I_{OF}$={$DJIA_{t-3,2,1}$,$X_{OF,t-3,2,1}$}

For the model test period of Dec. 1, 2008 to Dec. 19, 2008, forecasting accuracy was measured in terms of the average Mean Absolute Percentage Error ("MAPE") and via an accuracy of an upwards or downwards direction, as shown in Table III of FIG. 9. The results shown in FIG. 9 indicate that adding the OF mood dimension does not have an effect on prediction accuracy when compared to using only historical DJIA values, confirming the Granger causality analysis results. Further indicated is that adding the GPOMS calm mood dimension results in the highest prediction accuracy of 86.7% in terms of predicting a direction, and it has a significant improve in its MAPE value of 1.83% over other listed MAPE values, such as 1.95% for the OF mood dimension. Further, the sure and vital mood dimensions appear to actually reduce prediction accuracy when combined with the calm mood dimension, indicating that they do not contain information useful for an accurate prediction of DJIA values. Moreover, the combination of the happy mood dimension and the calm mood dimension does results in a generally high direction prediction accuracy of 80%, which was surprising and unexpected as the happy dimension did not have a good Granger causality relation with the DJIA at a lag of n=3 days (Table II, p=0.652). However, when the happy mood dimension is combined with the calm mood dimension, a more accurate SOFNN prediction having a MAPE of 1.79% and a direction accuracy of 80% is calculated.

Test 4

Focusing back on the calm mood dimension prediction ratings, the statistical significance of the SOFNN achieving the direction accuracy of 87.6% was assessed by calculating the odds of this result occurring by chance. The binomial distribution indicated that the probability of achieving exactly 87.6% correct guesses over 16 trials, which includes 20 days minus the weekends, with a 50% chance of success on each single trial, equals 0.32%. Taken over the data set range of Feb. 28, 2008 to Dec. 20, 2008, there are approximately 14.5 of such 20 day periods, and the odds of finding any period of 20 days for which the binomial probability calculated above would hold by chance was estimated to be $1-(1-0.0032)^{10.9}$=0.0343 or 3.4%. Therefore, the SOFNN direction accuracy is most likely not the results of chance or of the selection of a specifically favorable test period.

Further, the linear effect of both the GPMOS calm and happy mood dimensions on the DJIA, with a nested F-test between a full model F and a reduced model R, were tested, under the following equations:

$$F: D_t = \alpha + \sum_{i=1}^{n} \beta_i D_{t-i} + \sum_{i=1}^{3} \gamma_i X_{1,t-i} + \sum_{i=1}^{3} \gamma_i X_{6,t-i} + \epsilon_t$$

$$R: D_t = \alpha + \sum_{i=1}^{n} \beta_i D_{t-i} + \sum_{i=1}^{3} \gamma_i X_{1,t-i} + \epsilon_t$$

A p-value of 0.66 and a F-statistic of 0.53 was found, indicating that a linear combination of the calm and happy mood dimensions produces a worse result than the calm mood dimension would produce alone. As the non-linear, SOFNN prediction is more accurate after using a combination of the calm and happy dimensions, it is concluded that a nonlinear relation among the different dimensions of moods exists.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for predicting economic market trends, comprising the steps of:
   collecting, via a computer, a plurality of items from network communications for a first predetermined time range without regard to any topic associated with the communications;
   creating a communications collection from the plurality of items;
   subjecting, via a processor of the computer, the communications collection to a multi-dimensional mood assessment tool to determine a plurality of mood dimensions;

assigning a rating, via the processor, to each item of the communications collection based on at least one of the plurality of mood dimensions;

predicting, via the processor, future economic market values based on results from the multi-dimensional mood assessment tool and the at least one of the plurality of mood dimensions; and conmmunicating, via the processor, the prediction on an output device.

2. The method of claim 1, further comprising subjecting the communications collection to a second mood assessment tool.

3. The method of claim 1, wherein the plurality of mood dimensions are selected from the group of: postive, calm, alert, sure, vital, kind, and happy.

4. The method of claim 1, wherein the step of creating further includes a step at filtering the plurality of items to retain only items that contain an explicit statement of an author's mood state.

5. The method of claim 4, wherein the step of filtering comprises at least one of the steps of:

removing stop-words and punctuation, and removing regular expressions such as "http. "and "www.".

6. The method of claim 1, wherein the step of collecting involves accessing communications from at least one social network.

7. The method of claim 1, further comprising extracting a time series of economic market values from a web-based tool.

8. The method of claim 1, further comprising wherein the processor is at one of a server side and at least one client side, wherein the at least one client side is connected to the server side via a network.

9. The method of claim 1, further comprising the steps of:

predicting, via the processor, future economic market values based on results from the multi-dimensional mood assessment tool and the at least one of the plurality of mood dimensions for a future predetermined time range;

after the future predetermined time range expires, extracting, via the processor, a time series of actual economic market values for the expired future predetermined time range;

comparing the actual economic market values to the predicted future economic market values of the expired future predetermined time range;

calculating, via the processor, a percentage error of the predictions, and displaying, via the processor, the percentage error of the predictions on the output device.

10. A computer system for assisting a user in predicting economic market trends, the computer system comprising:

a processor and a memory for storing instructions:

a collection module in said memory, said collection module including an interface for collecting, via said processor, items comprising network communications for a first predetermined time range without regard to any topic associated with the communications to create a communications collection;

a mood assessment module in said memory, said mood assessment module enabling a subjection of said communications collection to a multi-dimensional mood assessment tool, said multidimensional mood assessment tool including a rating designated by at least one of a plurality of mood dimensions, said multi-dimensional mood assessment module sorting a selection of said communications collection into said rating designated by the at least one of a plurality of mood dimensions;

a prediction module in said memory, said prediction module predicting, via said processor, future economic market values based on results from said multi-dimensional mood assessment tool and the at least one of a plurality of mood dimensions; and a communication module in said memory, said communication module conveying, via said processor, said prediction on en output device.

11. The computer system of claim 10, wherein said mood assessment module enables a subjection of said communications collection to the multi-dimensional mood assessment tool and a second mood assessment tool.

12. The computer system of claim 11, wherein said second mood assessment tool measures a first mood dimension based on said communications collection and the multi-dimensional mood assessment tool measures a plurality of mood dimensions based on said communications collection, resulting in a mood time series.

13. The computer system of claim 12, wherein said plurality of mood dimensions is selected from the group consisting of: positive, calm, alert, sure, vital, kind, and happy.

14. The computer system of claim 10, further comprising a filtering module in said memory, said filtering module filtering, via said processor, said communications collection to create a filtered collection.

15. The computer system of claim 14, wherein said filtering module filters said collection of items using at least one of the following:

removing stop-words and punctuation, separating out items including statements of an author's mood state, and removing regular expressions such as "http: "and "www.".

16. The computer system of claim 10, wherein said collection module is adapted to access the items from a social network.

17. The computer system of claim 10, further comprising an extraction module in said memory, said extraction module extracting a time series of economic market values from a web-based tool via said processor.

18. The computer system of claim 10, further comprising a network interface.

19. The computer system of claim 10, further comprising an extraction module in said memory, said extraction module extracting, via said processor, a time series of actual economic market values for a second predetermined time range;

said prediction module predicting previous results from said multi-dimensional mood assessment tool;

a compare module in said memory, said compare module comparing said actual economic market values to said predicted previous results;

said output module calculating, via said processor, a percentage error of said predictions, and displaying, via said processor, said percentage error of the predictions on said output device.

* * * * *

UNITED STATES PATENT AND TRADEMARK OFFICE
CERTIFICATE OF CORRECTION

PATENT NO. : 8,380,607 B2  
APPLICATION NO. : 12/972401  
DATED : February 19, 2013  
INVENTOR(S) : Johan Bollen et al.

Page 1 of 1

It is certified that error appears in the above-identified patent and that said Letters Patent is hereby corrected as shown below:

On the title page, item (75),

Please change the name of the second inventor from Hulna Mao to Huina Mao

Signed and Sealed this
Fourteenth Day of May, 2013

Teresa Stanek Rea
*Acting Director of the United States Patent and Trademark Office*